J. C. SCHLEICHER.
DEMOUNTABLE TIRE CARRYING RIM.
APPLICATION FILED MAY 11, 1917.

1,363,277.

Patented Dec. 28, 1920.
2 SHEETS—SHEET 1.

Witness
Chas. L. Griesbauer.

Inventor
John C. Schleicher,
By Hull Smith Brock & West
Attorney

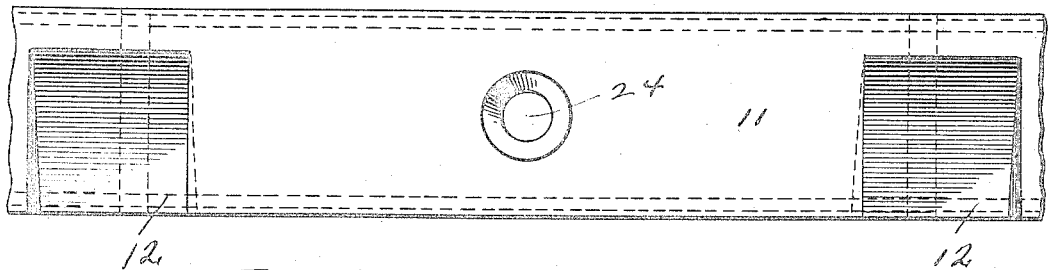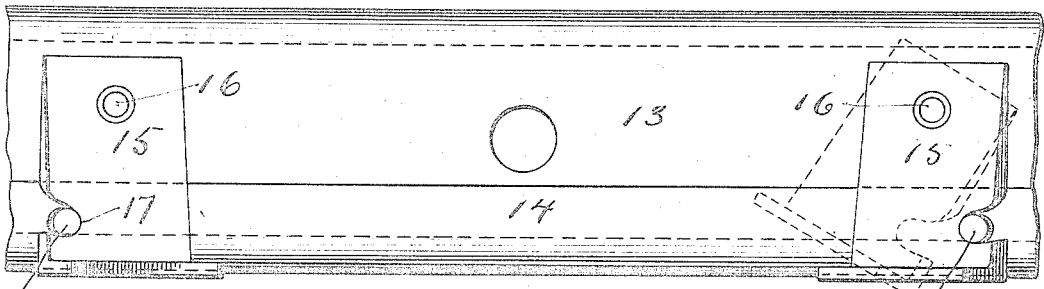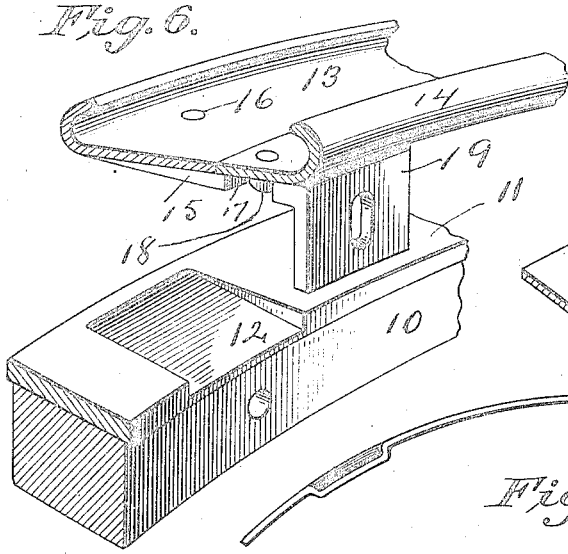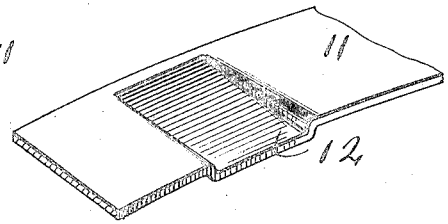

UNITED STATES PATENT OFFICE.

JOHN C. SCHLEICHER, OF MOUNT VERNON, NEW YORK.

DEMOUNTABLE-TIRE-CARRYING RIM.

1,363,277.	Specification of Letters Patent.	Patented Dec. 28, 1920.

Application filed May 11, 1917. Serial No. 167,953.

*To all whom it may concern:*

Be it known that I, JOHN C. SCHLEICHER, a citizen of the United States, residing at Mount Vernon, in the county of Westchester and State of New York, have invented certain new and useful Improvements in Demountable-Tire-Carrying Rims, of which the following is a specification.

This invention is a demountable tire carrying rim for automobile wheels.

One object of the invention is to provide a rim having means for securing and tensioning the rim upon the wheel body.

Another object is to provide a two-piece rim which can be quickly and easily separated to remove the tire therefrom and also readily fastened together to securely fasten the tire thereto.

Another object is to provide a two-piece rim provided with means for fastening the rim parts together, which means also serve to secure and tension the rim as a whole upon the wheel body.

With these objects in view and with other objects which will become apparent, the invention consists in certain features of construction, and in certain combinations hereinafter described and set forth in the claim.

In the drawings forming a part of the specification:—

Fig. 3 is a view showing a portion of the fellyband of wheel,

Fig. 4 is a view showing a portion of the inner face of the tire carrying rim,

Fig. 6 is a detail perspective view showing parts of rim, fellyband, and fastening devices, Fig. 7 is a detail view of a slightly modified form of fellyband, Fig. 8 is an edge view of the same.

Figure 1:
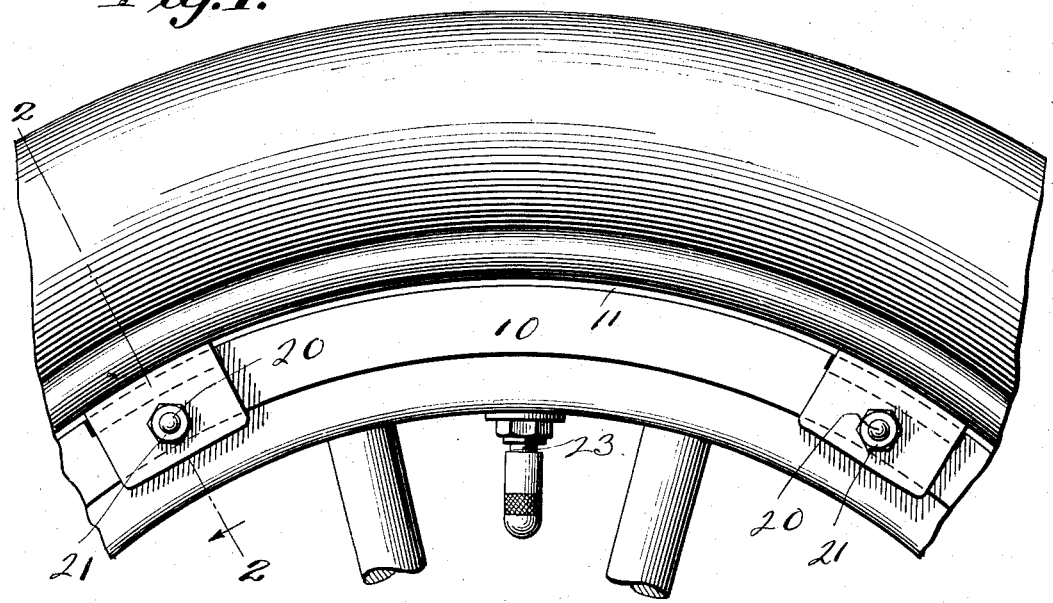
Figure 1 is a view showing a portion of a tire carrying rim embodying my invention.
Figure 9:
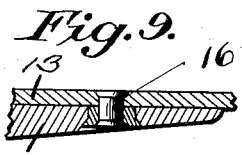
Fig. 9 is a detail view of the pivot connection.
Figure 2:
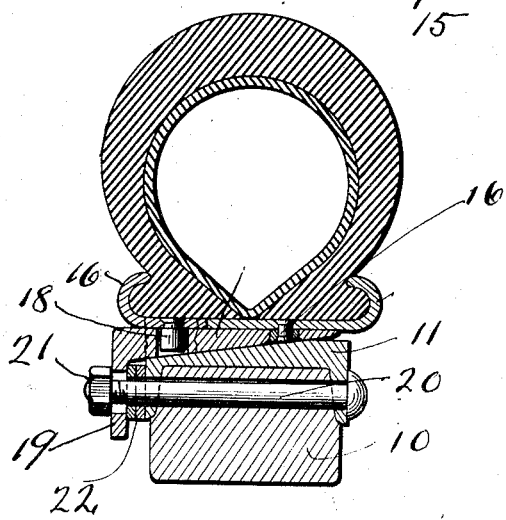
Fig. 2 is a section on the line 2—2 of Fig. 1.
Figure 5:
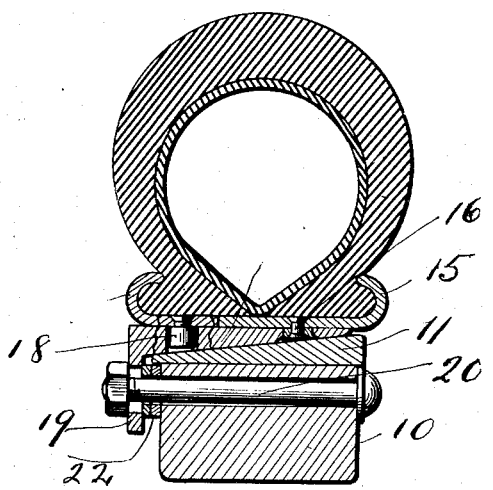
Fig. 5 is a transverse section of rim and felly slightly modified.

The wooden felly 10 has a fellyband 11 applied thereto and this may be channeled as shown in Fig. 2 or plain as shown in Figs. 5 and 6.

At definite intervals, this fellyband 11 is provided with transverse recesses 12, the bottoms of which slope or incline toward the outer edge of the band as shown. These recesses can be made by milling or they can be rolled into the band as shown in Fig. 7.

The tire carrying rim is preferably made in two pieces 13 and 14 and the rim can be a clencher or a straight side, but being divided and separable, the clencher type will probably be preferred.

The rim parts are united by latch plates 15 pivoted to one part at 16, and each having a notch 17 into which fits a pin 18 carried by the other part of the rim.

The latch is preferably pivoted to the inner portion of rim and the pins carried by the outer parts of rim and the latch plates 15 are made with angled, radially projecting portions 19 which are apertured and adapted to fit upon bolts 20 passing axially through the felly of wheel. These bolts are arranged in line with its recesses 12 so that when the latch plates fit into the recesses, the apertured ends thereof will fit over the bolt ends. The recesses taper and the faces of the latch plates are also tapered, consequently when the rim is fastened upon the wheel body by screwing nuts 21 upon the ends of bolts 20, the rim as a whole will be forced back laterally and as the taper faces contact, the rim will be tensioned upon the wheel.

It will be noticed that one latch turns to the right and the other to the left so that when the rim parts are put together and the latch plates locked, there can be no longitudinal or circumferential movement of the rim parts on each other.

In practice, I prefer to arrange two or more washers 22 between the ends 20 and felly of wheels so as to obtain a firm connection of all the parts and as the contacting portions of the rim and felly wear, this wear can be taken up by discarding a washer.

The rim being in two pieces, a tire can be quickly and easily arranged between these parts. The latch plates are then turned into locked positions and the rim parts are securely united with the tire therein and the rim with the tire is ready for mounting upon a wheel body.

In placing the rim upon the wheel the valve stem 23 is put through hole 24 and this determines the position of the rim parts with respect to the rim.

These parts are so positioned that the wedge latch plates of the rim will fit into the recesses in the fellyband, and no driving lugs such as now used will be required, as the latch plates in the recesses will prevent creeping.

When the nuts are screwed up against the ends 20 the rim will be properly positioned and tensioned.

In case a one-piece rim is employed, the plates will be rigidly secured to the rim instead of being pivoted but in other respects the construction and operation of the parts will be the same.

The latch plates not only serve to connect the rim parts, but they also serve to tension the rim and they also perform the function of driving lugs.

I claim:

In a two-part demountable tire carrying rim adapted to be secured to a wheel, a pivoted member carried by one part adapted to unite said rim parts, said pivoted part having a portion adapted for wedging engagement with a wheel body and means for connecting certain of said parts to said wheel body whereby said rim as a whole is tensioned and secured upon said wheel body.

In testimony whereof, I affix my signature in presence of a witness.

JOHN C. SCHLEICHER.

Witness:
CHAS. E. BROCK.